(12) United States Patent
Wines

(10) Patent No.: US 11,692,145 B1
(45) Date of Patent: Jul. 4, 2023

(54) METHOD AND SYSTEM FOR PURIFYING A CAUSTIC FLUID INCLUDING SULFUR

(71) Applicant: Pall Corporation, Port Washington, NY (US)

(72) Inventor: Thomas H. Wines, Port Washington, NY (US)

(73) Assignee: Pall Corporation, Port Washington, NY (US)

( * ) Notice: Subject to any disclaimer, the term of this patent is extended or adjusted under 35 U.S.C. 154(b) by 0 days.

(21) Appl. No.: 17/740,821

(22) Filed: May 10, 2022

(51) Int. Cl.
| | | |
|---|---|---|
| C10G 53/04 | (2006.01) | |
| B01D 17/04 | (2006.01) | |
| B01F 25/00 | (2022.01) | |
| B01F 23/45 | (2022.01) | |
| B01F 101/00 | (2022.01) | |

(52) U.S. Cl.
CPC ........... *C10G 53/04* (2013.01); *B01D 17/045* (2013.01); *B01F 23/45* (2022.01); *B01F 25/1051* (2022.01); *B01F 2101/2204* (2022.01); *C10G 2300/202* (2013.01); *C10G 2300/207* (2013.01)

(58) Field of Classification Search
None
See application file for complete search history.

(56) References Cited

U.S. PATENT DOCUMENTS

| | | |
|---|---|---|
| 4,666,689 A | 5/1987 | Maple et al. |
| 5,443,724 A | 8/1995 | Williamson et al. |
| 5,480,547 A | 1/1996 | Williamson et al. |
| 5,997,731 A | 12/1999 | Suarez |
| 6,749,741 B1 | 6/2004 | Laricchia et al. |
| 7,833,499 B2 | 11/2010 | Zang et al. |
| 10,316,257 B2 | 6/2019 | Engel et al. |
| 10,858,597 B2 | 12/2020 | McGehee et al. |
| 2001/0047967 A1 | 12/2001 | Williamson et al. |
| 2004/0175307 A1* | 9/2004 | Laricchia ........... B01D 11/0492 422/612 |
| 2012/0000827 A1 | 1/2012 | Krupa et al. |
| 2017/0037072 A1* | 2/2017 | Powell .................... C07H 1/00 |
| 2017/0037485 A1* | 2/2017 | Powell .................... C13K 1/02 |
| 2020/0222851 A1* | 7/2020 | De Ren ................. C10G 53/12 |
| 2021/0062098 A1* | 3/2021 | Iversen ................... C10G 3/50 |

FOREIGN PATENT DOCUMENTS

| | | |
|---|---|---|
| CN | 102958877 A | 3/2013 |
| EP | 0 831 958 A1 | 4/1998 |
| EP | 3 475 394 A1 | 5/2019 |
| WO | WO 96/33789 A1 | 10/1996 |
| WO | WO 2017/222830 A1 | 12/2017 |

OTHER PUBLICATIONS

Droplet Break-up in Valves, Typhonic, pp. 1-7, undated.
Silva et al., Experimental study of water droplet break up in water in oil dispersions using an apparatus that produces localized pressure drops, *Oil & Gas Sci. and Technol.*—Rev. IFP Energies nouvelles, 2019, 74, pp. 1-11.
Walsh, J.M., The Savvy Separator Series: Part 5 The Effect of Shear on Produced Water Treatment, *Oil and Gas Facilities*, pp. 16-23, Feb. 2016.
Wines et al., Minimizing Liquid Contaminants in Natural Gas Liquids, Pall Corporation, pp. 1-10, presented Mar. 1996.

* cited by examiner

*Primary Examiner* — Tam M Nguyen
(74) *Attorney, Agent, or Firm* — Leydig, Voit & Mayer, Ltd.

(57) ABSTRACT

Methods and systems for purifying a caustic fluid including sulfur are provided.

11 Claims, 1 Drawing Sheet

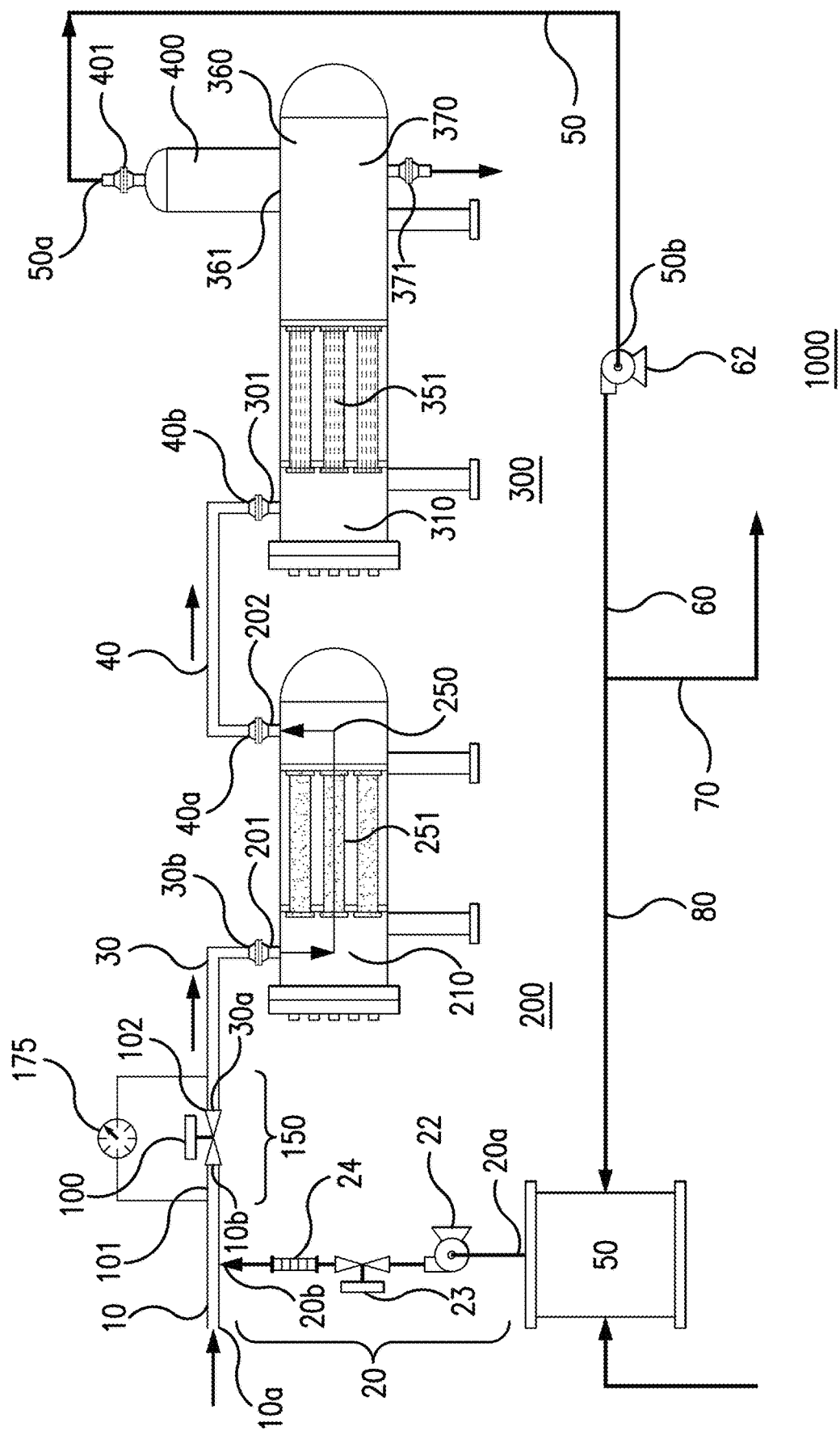

METHOD AND SYSTEM FOR PURIFYING A CAUSTIC FLUID INCLUDING SULFUR

BACKGROUND OF THE INVENTION

In a mercaptan removal system, disulfide oil (DSO) in a caustic stream is carried back to the final hydrocarbon product which can include propane, butane, liquid petroleum gas (LPG), fuel gas, naptha, or gasoline, resulting in an increased sulfur content, such that the sulfur content of the product exceeds the target specification.

There is a need for an improved system and method for removing sulfur from the caustic stream.

The present invention provides for ameliorating at least some of the disadvantages of the prior art. These and other advantages of the present invention will be apparent from the description as set forth below.

BRIEF SUMMARY OF THE INVENTION

An aspect of the invention provides a method for purifying a caustic fluid including sulfur, the method comprising: (a) mixing a caustic fluid including sulfur with a hydrocarbon solvent, including injecting the hydrocarbon solvent, at a pressure greater than a pressure of the caustic fluid including sulfur, at a rate in the range of 3% to 10% of a flow rate of the caustic fluid including sulfur into a mixing valve operated at a pressure differential across the mixing valve in the range of 10 psid to 50 psid; (b) passing the caustic fluid including sulfur mixed with hydrocarbon solvent at a temperature in the range of from 50° F. to 150° F. through a prefilter assembly operated at a pressure differential in the range of 1 psid to 25 psid, the prefilter assembly comprising a housing including the inlet and an outlet and defining a fluid flow path between the inlet and the outlet with at least one porous prefilter element in the housing across the fluid flow path, providing a solids-depleted caustic fluid including sulfur mixed with hydrocarbon solvent; (c) passing the solids-depleted caustic fluid including sulfur mixed with hydrocarbon solvent at a temperature in the range of from 50° F. to 150° F. through the inlet of a liquid-liquid coalescer assembly comprising a liquid-liquid coalescer assembly housing including the inlet and at least one liquid-liquid coalescer filter element in the liquid-liquid coalescer assembly housing, the liquid-liquid coalescer assembly housing having an upper part having an upper port, and a lower part having a lower port, wherein the liquid-liquid coalescer assembly is operated at a pressure differential in the range of 1 psid to 15 psid with a flow rate in the range of 10 gpm to 50 gpm per liquid-liquid coalescer filter element; (i) passing coalesced droplets comprising sulfur and hydrocarbon solvent through the upper port; and (ii) passing purified caustic fluid having a reduced sulfur content though the lower port.

In one aspect of the method, (a) includes mixing a caustic fluid including sulfur having a caustic concentration in the range of 1 degree Baume to 10 degrees Baume with the hydrocarbon solvent.

In a preferred aspect of the method, the caustic fluid including sulfur comprises disulfide oil (DSO).

In another aspect, a system for purifying a caustic fluid including sulfur, comprises: (a) a mixing assembly having at least a first inlet port, a mixing valve, and an outlet port; (b) a first conduit for receiving a caustic fluid including sulfur, the first conduit having a first conduit first end in fluid communication with a source of the caustic fluid, and a first conduit second end in fluid communication with the at least one inlet port of the mixing assembly; (c) a second conduit for receiving a hydrocarbon solvent, the second conduit having a second conduit first end in fluid communication with a source of the hydrocarbon solvent, and a second conduit second end in fluid communication with the first conduit; (d) a prefilter assembly comprising a housing having a prefilter assembly inlet and a prefilter assembly outlet and defining a fluid flow path between the prefilter assembly inlet and the prefilter assembly outlet, and having at least one porous prefilter element arranged in the prefilter assembly housing across the fluid flow path, wherein the prefilter assembly inlet is in fluid communication with the outlet port of the mixing assembly, and the prefilter assembly outlet is in fluid communication with an inlet of a liquid-liquid coalescer assembly; (e) the liquid-liquid coalescer assembly comprising a housing including at least one liquid-liquid coalescer filter element in the housing, the housing having the liquid-liquid coalescer assembly inlet, and an upper part having an upper port for receiving coalesced droplets comprising sulfur and hydrocarbon solvent, and a lower part having a lower port for receiving purified caustic fluid having a reduced sulfur content.

BRIEF DESCRIPTION OF THE SEVERAL VIEWS OF THE DRAWING(S)

The Figure is a drawing showing a schematic of a system according to an aspect of the invention.

DETAILED DESCRIPTION OF THE INVENTION

An aspect of the invention provides a method for purifying a caustic fluid including sulfur, the method comprising: (a) mixing a caustic fluid including sulfur with a hydrocarbon solvent, including injecting the hydrocarbon solvent, at a pressure greater than a pressure of the caustic fluid including sulfur, at a rate in the range of 3% to 10% of a flow rate of the caustic fluid including sulfur into a mixing valve operated at a pressure differential across the mixing valve in the range of 10 psid to 50 psid; (b) passing the caustic fluid including sulfur mixed with hydrocarbon solvent at a temperature in the range of from 50° F. to 150° F. through a prefilter assembly operated at a pressure differential in the range of 1 psid to 25 psid, the prefilter assembly comprising a housing including the inlet and an outlet and defining a fluid flow path between the inlet and the outlet with at least one porous prefilter element in the housing across the fluid flow path, providing a solids-depleted caustic fluid including sulfur mixed with hydrocarbon solvent; (c) passing the solids-depleted caustic fluid including sulfur mixed with hydrocarbon solvent at a temperature in the range of from 50° F. to 150° F. through the inlet of a liquid-liquid coalescer assembly comprising a liquid-liquid coalescer assembly housing including the inlet and at least one liquid-liquid coalescer filter element in the liquid-liquid coalescer assembly housing, the liquid-liquid coalescer assembly housing having an upper part having an upper port, and a lower part having a lower port, wherein the liquid-liquid coalescer assembly is operated at a pressure differential in the range of 1 psid to 15 psid with a flow rate in the range of 10 gpm to 50 gpm per liquid-liquid coalescer filter element; (i) passing coalesced droplets comprising sulfur and hydrocarbon solvent through the upper port; and (ii) passing purified caustic fluid having a reduced sulfur content though the lower port.

In one aspect of the method, (a) includes mixing a caustic fluid including sulfur having a caustic concentration in the range of 1 degree Baume to 10 degrees Baume with the hydrocarbon solvent.

In some aspects, the method is carried out at a system pressure in the range of 50 psig to 600 psig, e.g., to ensure that the hydrocarbon solvent is maintained in a liquid state.

In a preferred aspect of the method, the caustic fluid including sulfur comprises disulfide oil (DSO), in a more preferred aspect, the method comprises a mercaptan removal process.

In another aspect, a system for purifying a caustic fluid including sulfur, comprises: (a) a mixing assembly having at least a first inlet port, a mixing valve, and an outlet port; (b) a first conduit for receiving a caustic fluid including sulfur, the first conduit having a first conduit first end in fluid communication with a source of the caustic fluid, and a first conduit second end in fluid communication with the at least one inlet port of the mixing assembly; (c) a second conduit for receiving a hydrocarbon solvent, the second conduit having a second conduit first end in fluid communication with a source of the hydrocarbon solvent, and a second conduit second end in fluid communication with the first conduit; (d) a prefilter assembly comprising a housing having a prefilter assembly inlet and a prefilter assembly outlet and defining a fluid flow path between the prefilter assembly inlet and the prefilter assembly outlet, and having at least one porous filter element arranged in the prefilter assembly housing across the fluid flow path, wherein the prefilter assembly inlet is in fluid communication with the outlet port of the mixing assembly, and the prefilter assembly outlet is in fluid communication with an inlet of a liquid-liquid coalescer assembly; (e) the liquid-liquid coalescer assembly comprising a housing including at least one liquid-liquid coalescer filter element in the housing, the housing having the liquid-liquid coalescer assembly inlet, and an upper part having an upper port for receiving coalesced droplets comprising sulfur and hydrocarbon solvent, and a lower part having a lower port for receiving purified caustic fluid having a reduced sulfur content.

Aspects of the system further can comprise a first receptacle for receiving coalesced droplets comprising sulfur and hydrocarbon solvent passing from the upper port of the liquid-liquid coalescer assembly, and a second receptacle for receiving purified caustic fluid having a reduced sulfur content passing from the lower port of the liquid-liquid coalescer assembly.

In some aspects of the system, the system is operable at a system pressure in the range of 50 psig to 600 psig.

In alternative aspects of the method and system, the liquid-liquid coalescer assembly can include at least one porous prefilter element arranged upstream of the at least one liquid-liquid coalescer filter element in the liquid-liquid coalescer assembly housing (rather than, or in addition to, the separate prefilter assembly), wherein the at least one porous prefilter element can be in the form of, for example, a cartridge or a planar element.

Each of the components of the invention will now be described in more detail below, wherein like components have like reference numbers.

Using the illustrated aspect shown in the FIGURE for reference, system 1000 comprises: a mixing assembly 150 having at least a first inlet port 101, a mixing valve 100, and an outlet port 102 (in the illustrated aspect a differential pressure gauge 175 is arranged across the mixing assembly); a first conduit 10 for receiving a caustic fluid including sulfur, the first conduit having a first conduit first end 10a in fluid communication with a source of the caustic fluid, and a first conduit second end 10b in fluid communication with the at least one inlet port of the mixing assembly; a second conduit 20 for receiving a hydrocarbon solvent, the second conduit having a second conduit first end 20a in fluid communication with a source 50 of the hydrocarbon solvent, and a second conduit second end 20b in fluid communication with the first conduit (in the illustrated aspect a pump 22, a flow control valve 23 and a flow meter 24 are interposed between the second conduit ends 20a and 20b; a third conduit 30 for receiving the mixed fluid exiting the mixing assembly, the third conduit having a third conduit first end 30a in fluid communication with the outlet port of the mixing assembly, and a third conduit second end 30b in fluid communication with a prefilter assembly inlet 201 of a prefilter assembly 200 comprising a housing 210 having the prefilter assembly inlet 201 and a prefilter assembly outlet 202 and defining a fluid flow path 250 between the inlet and the outlet, and having at least one porous prefilter element (e.g., a porous prefilter cartridge) 251 arranged in the housing across the fluid flow path, the prefilter assembly outlet in fluid communication, via a fourth conduit 40 having a first end 40a and a second end 40b, with a liquid-liquid coalescer assembly inlet 301 of a liquid-liquid coalescer assembly 300, the liquid-liquid coalescer assembly comprising a housing 310 including at least one liquid-liquid coalescer filter element 351 in the housing, and an upper part 360 having an upper port 361 for receiving coalesced droplets comprising sulfur and hydrocarbon solvent, and a lower part 370 having a lower port 371 for receiving purified caustic fluid having a reduced sulfur content, wherein the purified caustic fluid can be passed from lower port 371 to, for example, a mercaptan removal extractor.

In one preferred aspect, the system includes a collection sump 400 communicating with the upper port 361, the sump receiving coalesced droplets comprising sulfur and hydrocarbon solvent, wherein hydrocarbon extract can be passed from collection sump port 401 along fifth conduit 50 having a first end 50a and a second end 50b via pump 62 and subsequently, for distillation or hydrotreatment, via sixth and seventh conduits 60 and 70, or for recirculation, via eighth conduit 80 to source 50 of the hydrocarbon solvent.

Suitable hydrocarbon solvents include, for example, naphtha, hexane, liquid propane and other hydrocarbon solvents with low sulfur content.

A variety of mixing assemblies including mixing valves are suitable for use in aspects of the invention. In one aspect, the mixing valve comprises a globe valve.

The injection of the hydrocarbon solvent into the mixing assembly can be performed by, for example, a pump; or a pressurized reservoir with an inert gas to raise the pressure higher than the pressure of the caustic stream so that the hydrocarbon solvent will flow into the caustic stream.

Suitable prefilter assemblies include, for example, PROFILE® filters and PROFILE® II filters, commercially available from Pall Corporation (Port Washington, N.Y.). Prefilter assemblies can have any number of porous prefilter elements, in some aspects, at least two porous prefilter elements, e.g., three or more prefilter elements.

Preferred liquid-liquid coalescer assemblies include those described in U.S. Pat. Nos. 5,443,724 and 5,480,547, U.S. Patent Application Publication 2001/0047967, and EP 0,831,958. Suitable liquid-liquid coalescer assemblies are commercially available from Pall Corporation (Port Washington, N.Y.). Liquid-liquid coalescer assemblies can have any number of liquid-liquid coalescer filter elements (e.g., liquid-liquid coalescer filter elements in the form of cartridges), typically, at least two liquid-liquid coalescer filter elements, e.g., three or more liquid-liquid coalescer filter elements, in some aspects, at least four fluoropolymer liquid-liquid coalescer filter elements.

Preferably, the coalescer and prefilter cartridges are constructed using fluoropolymer media such as ethylene chlorotrifluoroethylene (ECTFE) or polyvinylidene fluoride (PVDF), nylon media, polyphenylene sulfide (PPS) media or other materials compatible with caustic and hydrocarbons and can contain stainless steel support materials and end caps. The housings that hold the prefilters and coalescers can be made from carbon steel or stainless steel.

The following example further illustrates the invention but, of course, should not be construed as in any way limiting its scope.

EXAMPLE

This example demonstrates reducing sulfur from a caustic fluid including DSO according to an aspect of the invention.

Using the schematic of the system shown in the FIGURE for reference, a first fluid stream comprising a caustic containing>350 ppmw of DSO and a solid phase is run at 100 gpm, and a low sulfur naphtha hydrocarbon solvent is injected (using a pump with a flowrate controlled using a flow control valve and a flow meter) into the first fluid stream at a flow rate of 5 gpm (5% of caustic flowrate).

The caustic and solvent are mixed together by passing through a globe mixing valve, adjusted to create 15 psid of differential pressure measured by the differential pressure gauge (thus creating a shear leading to the creation of fine drops in the micron size range for improved subsequent coalescence and mass transfer of sulfur from the caustic phase into the hydrocarbon solvent phase), and the mixture is passed through a prefilter assembly having two nylon porous depth prefilter cartridges (each 60-inch length by 6-inch diameter) (tradename PROFILE® filter, Pall Corporation, Port Washington, N.Y.) to remove the solid phase and start the coalescing process that increases drop sizes, and the mixture, depleted of solid phase, is passed into a horizontally configured liquid—liquid coalescer assembly having four fluoropolymer liquid—liquid coalescer cartridges (each 40-inch length by 3¾-inch diameter), providing agglomerated emulsified droplets including the solvent and DSO that coalesce and are more easily separated from the caustic by buoyancy, and collected from the upper part of the liquid—liquid coalescer assembly in a hydrocarbon sump, that is drained periodically as part of a continuous process. The purified caustic (reduced to<180 ppmw of DSO) passes from the lower part of the liquid—liquid coalescer assembly to a mercaptan extractor tower, providing a final product hydrocarbon that reliably maintains low sulfur content below the target specification on a continuous basis.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred aspects of this invention are described herein, including the best mode known to the inventors for carrying out the invention. Variations of those preferred aspects may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method for purifying a caustic fluid including sulfur, the method comprising:
   (a) mixing the caustic fluid including sulfur with a hydrocarbon solvent, including injecting the hydrocarbon solvent, at a pressure greater than a pressure of the caustic fluid including sulfur, at a rate in the range of 3% to 10% of a flow rate of the caustic fluid including sulfur into a mixing valve operated at a pressure differential across the mixing valve in the range of 10 psid to 50 psid;
   (b) passing the caustic fluid including sulfur mixed with hydrocarbon solvent at a temperature in the range of from 50° F. to 150° F. through a pre-filter assembly operated at a pressure differential in the range of 1 psid to 25 psid, the prefilter assembly comprising a housing including the inlet and an outlet and defining a fluid flow path between the inlet and the outlet with at least one porous prefilter element in the housing across the fluid flow path, providing a solids-depleted caustic fluid including sulfur mixed with hydrocarbon solvent;
   (c) passing the solids-depleted caustic fluid including sulfur mixed with hydrocarbon solvent at a temperature in the range of from 50° F. to 150° F. through the inlet of a liquid-liquid coalescer assembly comprising a liquid-liquid coalescer assembly housing including the inlet and at least one liquid-liquid coalescer filter element in the liquid-liquid coalescer assembly housing, the liquid-liquid coalescer assembly housing having an upper part having an upper port, and a lower part having a lower port, wherein the liquid-liquid coalescer assembly is operated at a pressure differential in the range of 1 psid to 15 psid, with a flow rate in the range of 10 gpm to 50 gpm per liquid-liquid coalescer filter element;
   (i) passing coalesced droplets comprising sulfur and hydrocarbon solvent through the upper port; and (ii) passing purified caustic fluid having a reduced sulfur content though the lower port.

2. The method of claim 1, wherein the caustic fluid including sulfur comprises disulfide oil (DSO).

3. The method of claim 2, wherein (a) includes mixing a caustic fluid including sulfur having a caustic concentration in the range of 1 degree Baume to 10 degrees Baume with the hydrocarbon solvent.

4. The method of claim 1, comprising a mercaptan removal process.

5. The method of claim 1, wherein the method is carried out at a system pressure in the range of 50 psig to 600 psig.

6. The method of claim 3, wherein (a) includes mixing a caustic fluid including sulfur having a caustic concentration in the range of 1 degree Baume to 10 degrees Baume with the hydrocarbon solvent.

7. The method of claim 2, comprising a mercaptan removal process.

8. The method of claim 3, comprising a mercaptan removal process.

9. The method of claim 2, wherein the method is carried out at a system pressure in the range of 50 psig to 600 psig.

10. The method of claim 3, wherein the method is carried out at a system pressure in the range of 50 psig to 600 psig.

11. The method of claim 4, wherein the method is carried out at a system pressure in the range of 50 psig to 600 psig.

* * * * *